(12) United States Patent
Kamath et al.

(10) Patent No.: US 9,122,383 B2
(45) Date of Patent: Sep. 1, 2015

(54) OBJECT VISUALIZATION

(75) Inventors: Harish B. Kamath, Bengalooru Karanataka (IN); Vara Prasad Onteru, Bangalore Karnataka (IN); Karthigeyan Kasthurirengan, Karnataka (IN); Dharmendra, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 89 days.

(21) Appl. No.: 13/447,788

(22) Filed: Apr. 16, 2012

(65) Prior Publication Data

US 2013/0275919 A1    Oct. 17, 2013

(51) Int. Cl.
*G06F 3/0482* (2013.01)
*G06F 3/0484* (2013.01)

(52) U.S. Cl.
CPC ........ *G06F 3/04842* (2013.01); *G06F 3/04847* (2013.01)

(58) Field of Classification Search
CPC ....................... G06F 17/30247; G06F 3/04842
USPC .......................................................... 715/846
See application file for complete search history.

(56) References Cited

U.S. PATENT DOCUMENTS

| | | | |
|---|---|---|---|
| 7,953,903 B1 | 5/2011 | Finkelstein et al. | |
| 8,028,250 B2 * | 9/2011 | Vronay et al. | 715/853 |
| 2002/0156984 A1 * | 10/2002 | Padovano | 711/148 |
| 2004/0138934 A1 | 7/2004 | Johnson et al. | |
| 2007/0136683 A1 * | 6/2007 | Heidari et al. | 715/792 |
| 2007/0226640 A1 * | 9/2007 | Holbrook et al. | 715/765 |
| 2010/0023862 A1 * | 1/2010 | Tai et al. | 715/721 |
| 2010/0131881 A1 * | 5/2010 | Ganesh | 715/769 |
| 2011/0029673 A1 | 2/2011 | Jaisinghani | |
| 2011/0047014 A1 * | 2/2011 | De Angelo | 705/14.4 |
| 2011/0126139 A1 * | 5/2011 | Jeong et al. | 715/767 |
| 2011/0246941 A1 * | 10/2011 | Gonzalez | 715/816 |
| 2011/0249003 A1 | 10/2011 | Mercuri | |
| 2012/0005584 A1 | 1/2012 | Seago et al. | |
| 2012/0023438 A1 * | 1/2012 | Xia et al. | 715/783 |
| 2012/0042283 A1 * | 2/2012 | Tuesta et al. | 715/834 |
| 2013/0080975 A1 * | 3/2013 | Geithner | 715/828 |

OTHER PUBLICATIONS

Don Leclair, et al.; "Systems Management"; 2007; CA Green Books; pp. 1-352; https://support.ca.com/phpdocs/0/common/greenbooks/NSM_Systems_Management_Green_Book_ENU.pdf.

* cited by examiner

*Primary Examiner* — Reza Nabi
*Assistant Examiner* — Daniel Rodriguez
(74) *Attorney, Agent, or Firm* — Van Cott, Bagley, Cornwall & McCarthy

(57) ABSTRACT

A method for object visualization includes providing an operator with an object filter tool through a graphical user interface, the tool comprising a rail having a number of shapes placed at distances from each other along the rail, the shapes representing divisions within a list of objects, distances between the shapes correlating to a number of objects between the divisions. The method further includes receiving from the operator, an interaction with the tool indicating a selection of objects within the list and presenting to the operator, a list of objects filtered based on the interaction with the filter tool.

20 Claims, 6 Drawing Sheets

600

Provide an operator with an object filter tool through a graphical user interface, said tool comprising a rail having a number of shapes placed at distances from each other along the rail, the shapes representing divisions within a list of objects, distances between the shapes corresponding to a number of objects between the divisions
(block 602)

Receive from the operator, an interaction with the tool indicating a selection of objects within the list
(block 604)

Present to the operator, a list of objects filtered based on the interaction with the filter tool
(block 606)

*Fig. 6*

OBJECT VISUALIZATION

BACKGROUND

Graphical user interfaces provide a user with a way to interact with the functionality of a computer system. Often time, computer systems are used to manage large sets of objects. For example, standard operating systems manage large sets of files placed within folders. These files may be text, audio, picture, or video files.

Some computing applications manage more specific objects. For example, in a security operations center application, objects may represent users. Users may be associated with multiple dimensions. Specifically, users may be identified by usernames, users may be allowed to access specific resources, and users may be registered with specific hosts on a computer network. Each of these aspects represents a different dimension associated with a user.

When dealing with such multidimensional objects, it is often difficult for an administrator to visualize, sort through, and monitor such objects. Specifically, the administrator has to look at each dimension separately. For example, an administrator may wish to search for users according to usernames. Additionally or alternatively, an administrator may wish to search for users based on which users are able to access one or more hosts. Furthermore, the list of users may be so long that it is time consuming to scroll through the list to find a particular subset of users.

BRIEF DESCRIPTION OF THE DRAWINGS

The accompanying drawings illustrate various examples of the principles described herein and are a part of the specification. The drawings are merely examples and do not limit the scope of the claims.

FIG. 6 is a flowchart showing an illustrative method for object visualization, according to one example of principles described herein.

Throughout the drawings, identical reference numbers designate similar, but not necessarily identical, elements.

DETAILED DESCRIPTION

As mentioned above, when dealing with multidimensional objects, it is often difficult for an administrator to visualize, sort through, and monitor such objects. Specifically, the administrator has to look at each dimension separately. Furthermore, the list of users may be so long that it is time consuming to scroll through the list to find a particular user or subset of users.

In light of this and other issues, the present specification discloses methods and system for object visualization within a graphical user interface. The graphical user interface may include a dashboard that has a number of tools used for object visualization. Such object visualization may be either single dimensional or multidimensional. According to certain illustrative examples, a list of objects within a single dimension is represented by a number of shapes placed along a rail. The shapes represent objects within an ordered list that are at certain distances within the list relative to the entire list. The distance between the shapes along the rail correlates to the number of objects within the ordered list between the objects represented by the shapes.

When a user interacts with a segment of the rail, then objects associated with that segment are selected for display within the list. The administrator may have the option to zoom in on a rail segment to further narrow down the list of objects for display. In some examples, the rail may be in the shape of a circle. Interaction with the center of the circle may select all objects within the dimension associated with the rail.

In some cases, multiple rails may be used for multiple dimensions. For example, in the case of a network security application in which objects represent users of the system, one rail may be used for usernames and another rail may be used for hosts within the system. Other visualization tools may be used for other dimensions such as resources of the system.

Through use of methods and systems embodying principles described herein, an administrator can be provided with an efficient mechanism for viewing, filtering, and managing objects. In cases where there are several objects spread horizontally within a particular hierarchal level, the administrator can easily and intuitively navigate through such objects. The administrator may then perform the various administrative functions on those objects.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
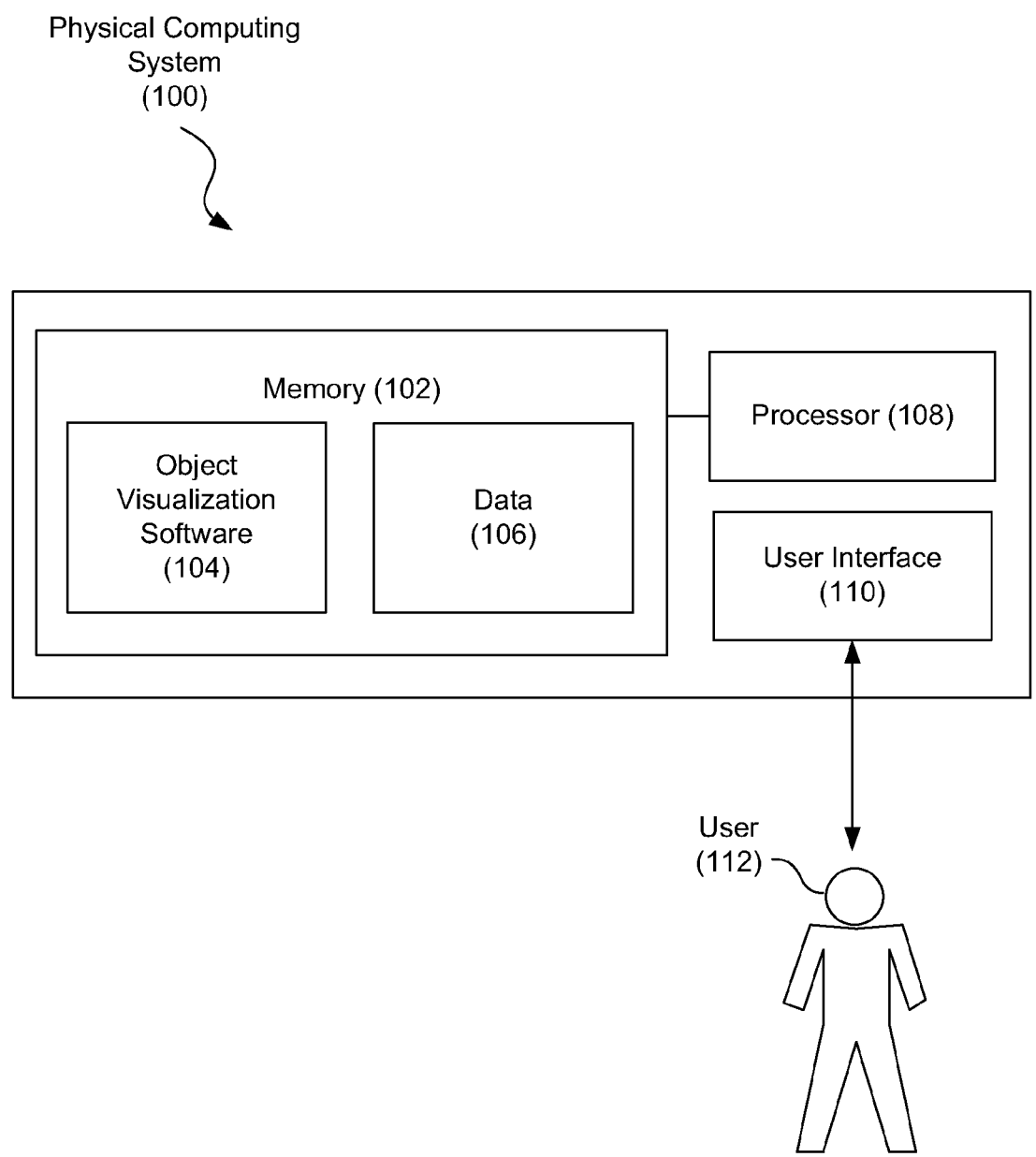
FIG. 1 is a diagram showing an illustrative physical computing system, according to one example of principles described herein.

Referring now to the figures, FIG. 1 is a diagram showing an illustrative physical computing system (100) that may be used for object visualization. According to certain illustrative examples, the physical computing system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106). Software refers to computer readable instructions.

The physical computing system (100) also includes a processor (108) for executing the software (104) and using or updating the data (106) stored in memory (102). The software (104) may include an operating system. An operating system allows other applications to interact properly with the hardware of the physical computing system. Such other applications may include object visualization software (104). The object visualization software includes the functionality of allowing an operator to view multiple objects in whatever context for which the software is designed.

A user interface (110) may provide a way for the user (112) to interact with the physical computing system (100). The user interface may include any collection of devices for interfacing with a human user (112). For example, the user interface (110) may include an input device such as a keyboard, mouse, trackpad, touch pad, or touch screen and an output device such as a monitor.

Figure 2:
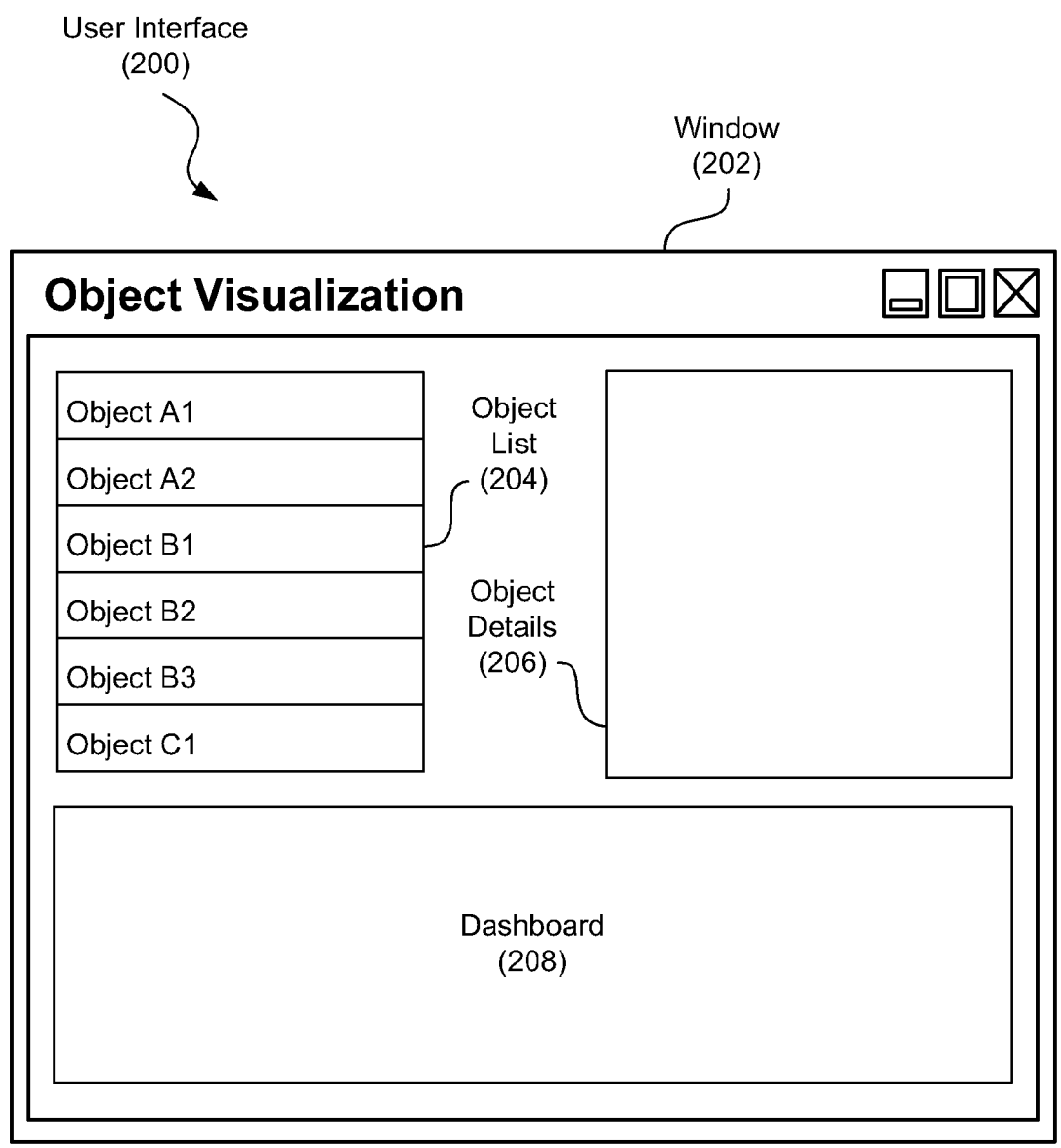
FIG. 2 is a diagram showing an illustrative user interface, according to one example of principles described herein.

FIG. 2 is a diagram showing an illustrative user interface (200). According to certain illustrative examples, the user interface (200) may be embodied as a window (202) within the operating platform of the physical computing device running the object visualization software. The user interface (200) includes an object list (204), object details (206), and an object dashboard (208).

The object list (204) lists the various objects relevant to the viewer. In the example of a network security system, the objects may represent users who are authorized to access the network. The objects may be presented alphabetically by user name. Each object may have various details associated therewith which may be displayed in the object details box (206) for a selected object. In the example of the objects being users authorized for a network security system, these details may include personal data, assigned roles, and other information.

The dashboard (208) includes a set of tools and filters that allow a viewer to quickly sort through large lists of objects. Objects are often organized in a hierarchal manner. For example, files within a computing system are often represented in a hierarchal manner through a folder system. Each folder may contain objects or folders filled with more objects. The folders in which objects are placed typically correspond to a logical categorization of such objects.

In some cases, however, there may be a large number of objects within a single logical categorization. In such cases, it can be cumbersome to scroll through a large number of objects to find a desired object or set of objects. This may be so even if the objects are ordered in a logical manner. For example, if there are thousands of users within a single categorization, it may be difficult to scroll through those users to find a particular user even if those users are ordered alphabetically by username. In light of this issue, the present specification discloses intuitive tools to allow for more efficient object visualization.

Figure 3A:
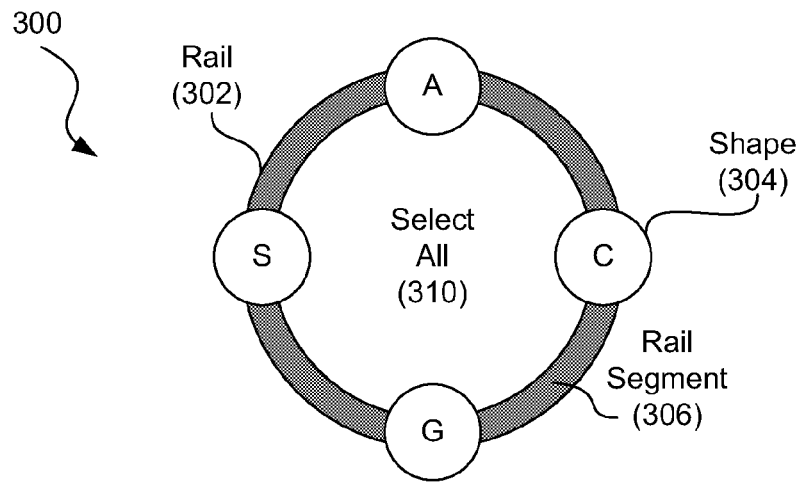
FIGS. 3A-3C are diagrams showing illustrative selection tools used for object visualization, according to one example of principles described herein.
Figure 3B:
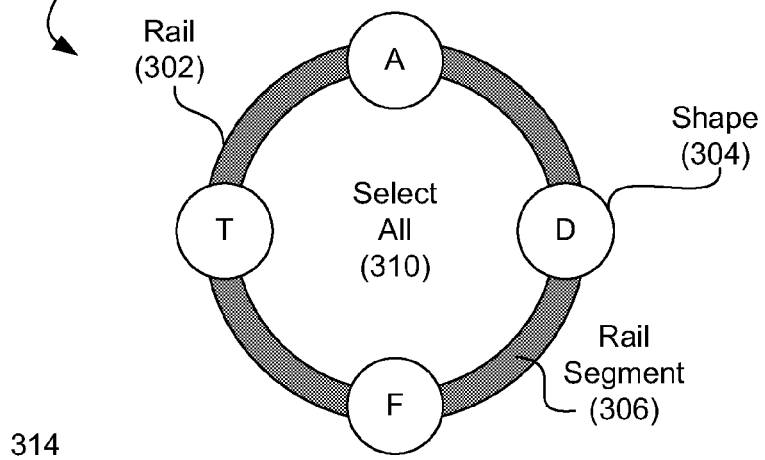
Figure 3C:
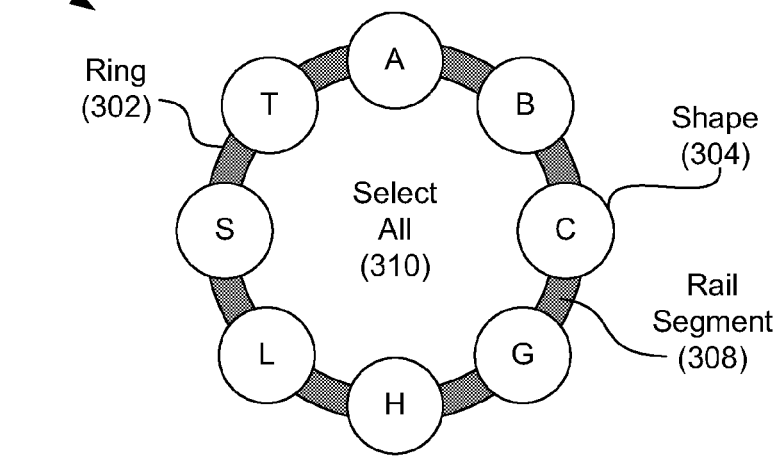

FIGS. 3A-3C are diagrams showing illustrative selection tools used for object visualization. FIG. 3A is a diagram showing an illustrative tool (300) that includes a number of shapes (304) placed along a rail (302). In this example, both the shapes (304) and the rail (302) are circular. In other examples, however, the rail (302) and the shapes (304) may be other shapes.

Each of the shapes (304) represents a division within a list of objects. For example, in a list of users listed alphabetically by username, the shapes represent a division within that list. Specifically, the shape labeled "C" divides all the usernames between those that alphabetically come before C and those that alphabetically come after C. Moreover, the rail segments (306) in between shapes represent all the objects between two divisions. Specifically, the rail segment between C and G represents all usernames that fall within that alphabetical range. Likewise, the rail segment between G and S represents all the usernames that fall within that alphabetical range.

According to certain illustrative examples, the distance between shapes correlates to the number of objects within the associated rail segment. In the example of FIG. 3A, there is an equal distance between all four shapes. This indicates that the number of usernames between each division is the same. Specifically, the number of users with usernames ranging between A and C is the same number of users with user names ranging between C and G, G and S, and S and Z. In some cases, the distance between each of the shapes (304) may not be equal distances from each other. In such cases, the distance between the shapes may still represent the number of objects between the divisions represented by the shapes.

Through use of such a tool (300) as illustrated in FIG. 3A, an administrator can efficiently filter out objects within a list. For example, if the administrator selects the rail segment (306) between C and G, then only the users with usernames within that alphabetical range will be shown in the list. The administrator may also select other rail segments (306) to include within the list of objects being displayed. The rail segments (306) may be selected and deselected as desired.

In some examples, the middle of the rail (302) may include a select all feature (310). By engaging with the select all feature (310), the administrator can select all rail segments (306). The center of the rail may be editable to display a particular word or phrase as defined by an administrator. The center of the rail may also be changed to provide different functions. For example, instead of selecting all rail segments (306), the center of the rail may be used to change the dimension being filtered by the rail.

In some cases, the list of objects to be filtered out by the tool may be changed. FIG. 3B illustrates the tool (312) after the list of objects has changed. Because there are a different number of objects, the equidistant divisions will be located at different places within the alphabetical order. Thus, the divisions represented on the shapes (304) have changed. The change in the total number of objects may be a result of a variety of different factors. In some cases, other tools to filter out objects based on other characteristics besides usernames may have been engaged. For example, an administrator may filter out objects based on functional aspects such as the size of the object if the object represents a file. Alternatively, the administrator may filter the objects based on which objects are encrypted in a particular manner. The tools used to filter such aspects will be discussed in further detail below.

FIG. 3C is a diagram showing an illustrative filter tool with more divisions. In some cases, an administrator may wish to be provided with more precise filtering options. In such cases, the administrator may have the option of "zooming in" and being provided with more divisions. In the example of FIG. 3C, the list of objects is divided into eight divisions, each division represented by a shape (304). The administrator may thus select or deselect any of the eight rail segments to narrow the object list as desired.

In some cases, an administrator may be able to create shapes (304) at arbitrary points along the rail (302). For example, the administrator may wish to create new divisions within the list of objects represented by the rail. The user may do so by interacting with a point on the rail in a particular manner and creating a new shape at that point.

Figure 4:
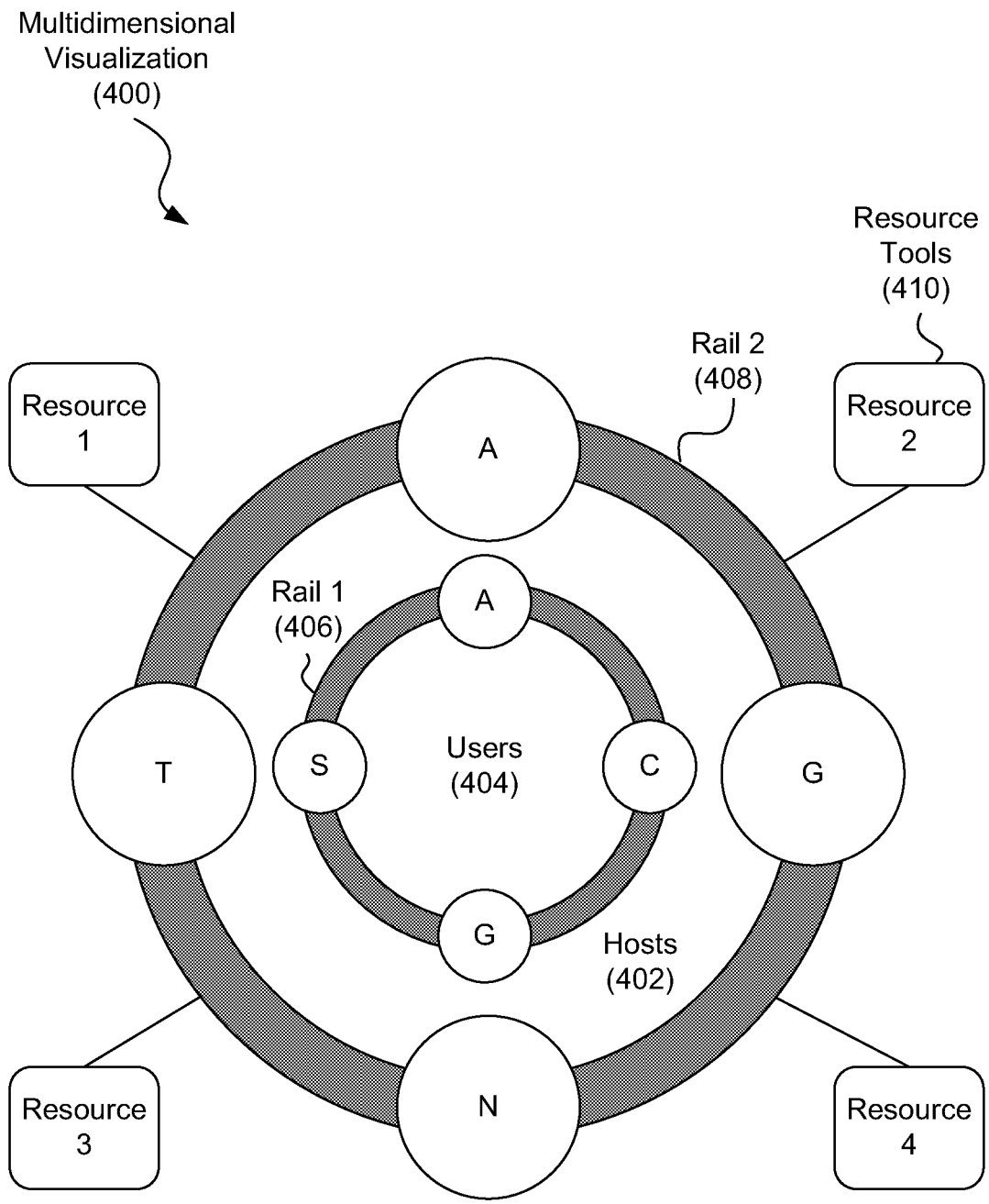
FIG. 4 is a diagram showing an illustrative tool for multidimensional object visualization, according to one example of principles described herein.

FIG. 4 is a diagram showing an illustrative tool for multi-dimensional object visualization (400). According to certain illustrative examples, objects may involve multiple dimensions. As mentioned above, in the example where objects are used to represent users who are authorized to access a computer network system, there may be multiple dimensions to each object. These dimensions may include usernames, hosts which a user can access, and network resources a user may access. Oftentimes, an administrator wishes to visualize the objects within each of these dimensions. For example, an administrator may wish to quickly view the users within a username alphabetical range that are allowed to access a particular host and a particular network resource.

FIG. 4 illustrates two rails. The first rail (406) is smaller than the second rail (408) and is placed within the second rail (408). In this example, the first rail (406) is used to filter out users by usernames. The second rail (408) is used to represent hosts. The network system may have a large number of hosts from which users may access the network. These hosts may be assigned names and organized alphabetically.

Through use of such a multidimensional object filtering tool, an administrator may sort through a list of objects by filtering in multiple dimensions. For example, the administrator may narrow the list of objects by the alphabetical range of usernames and the alphabetical range of hosts in which those users are able to access. Specifically, if the rail segment of the second rail (408) between G and N is selected and the rail segment of the first rail (406) between G and S is selected, then the list of users will include those with usernames within the selected alphabetical range who have access to hosts having been assigned names within the selected range. In some examples, if the administrator wishes to select all users, he or she may select the users (404) feature within the first rail (406). Additionally or alternatively, if the administrator wishes to select all hosts, he or she may select the hosts (402) feature within the second rail (408) but outside the first rail (406).

In addition to filtering objects by username and hosts, an administrator may wish to further narrow the object list by other dimensions. For example, certain users will have access to certain resources within the computer network system. These resources may include, storage drives, sub-networks, virtual machines, and blade servers. The multidimensional object visualization tool may provide an administrator with a number of resource tools (410). The administrator may select and deselect these resource tools (410) as desired to filter out users based on the resources to which they have access.

In some examples, a particular rail may filter objects by different dimensions as selected by the administrator. For example, the second rail (408) may be used to filter hosts as a default. However, the administrator may engage other tools that will switch the second rail (408) to filter out a particular resource. For example, if one of the resource tools relates to virtual machines, then when the administrator selects that resource tool, the second rail (410) may represent virtual machines alphabetically.

In some cases, a rail may represent divisions numerically rather than alphabetically. For example, while hosts and usernames may be ordered alphabetically, virtual machines may be assigned numbers. In such cases, the shapes may represent numerical divisions.

The tools illustrated herein are merely examples of how a filtering tool embodying principles described herein may appear. In some cases, the rails may not be circuitous but rather be straight lines. In some cases, the shapes placed along the rails may not be circles but rather ellipses, squares, rectangles, or polygons.

Figure 5:
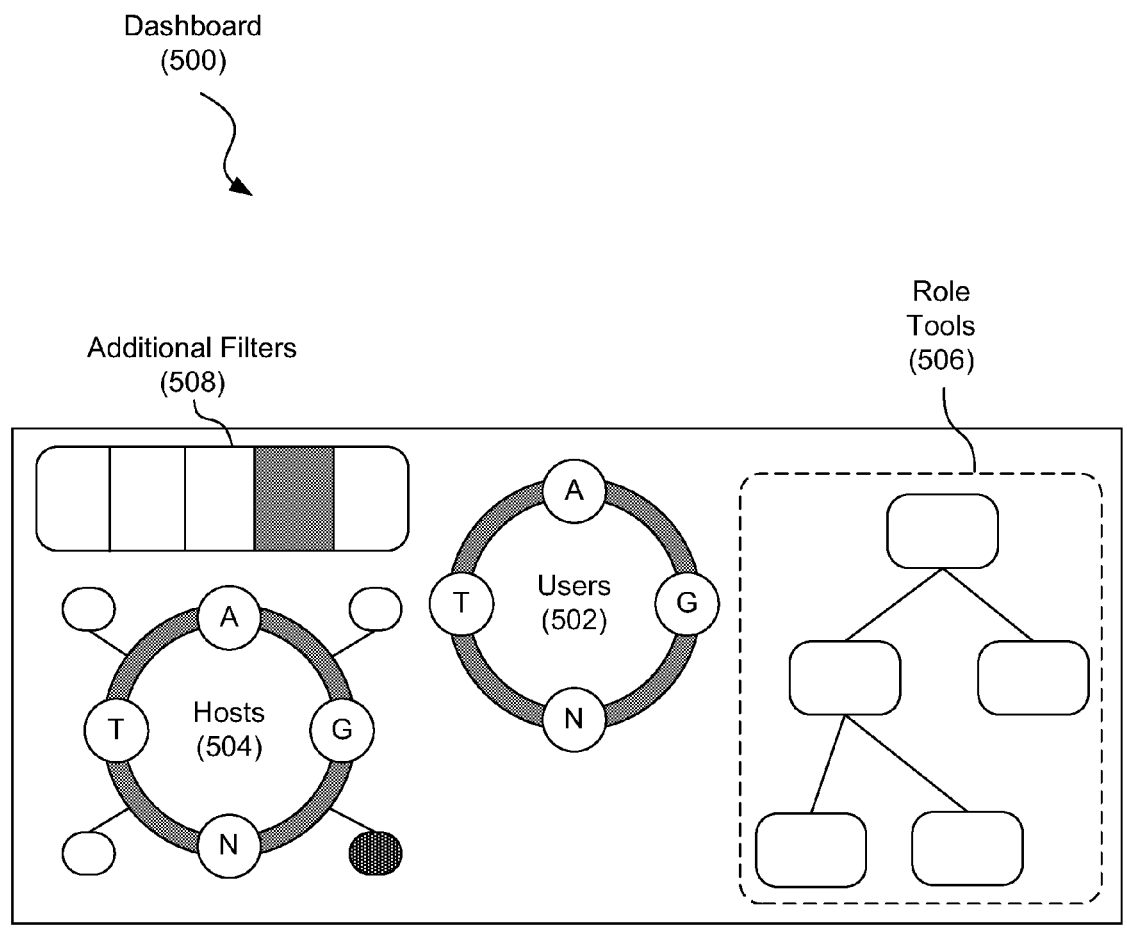
FIG. 5 is a diagram showing an illustrative dashboard of object visualization tools, according to one example of principles described herein.

FIG. 5 is a diagram showing an illustrative dashboard (500) of object visualization tools. According to certain illustrative examples, the dashboard (500) includes a users rail (502) and a hosts rail (504). In this example, the two rails are adjacent to each other rather than one being inside the other. The hosts rail (504) has resource filters connected to it which allow the administrator to filter objects in a list by the resources associated with those objects.

In some cases, an administrator may use additional filters (508) which may be appropriate for the type of objects being filtered. Such additional filters may be for such properties that do not have a wide range of options such as usernames or host names. For example, the additional filters may be used to filter out protected, encrypted, or large size objects.

According to certain illustrative examples, the dashboard (500) may be used to filter objects according to roles. Users within a computer network system are often assigned roles. A role defines what resources a particular user may access. Such roles may be defined in a hierarchal manner. For example, a tree structure may be used to describe the different roles. Someone with a role that provides access to all resources may be given a role corresponding with the root node of the tree structure. Such roles are typically given to system administrators. Various other roles may be assigned which correspond to child or grandchild nodes of the root node. Such nodes correspond to roles that provide a user with less access to certain resources.

An administrator may be able to filter the list of objects being displayed based on roles. Specifically, the administrator may select particular roles within the role tools (506). The objects with the unselected roles may then be filtered out of the object list accordingly. This provides the administrator with further ability to view the objects in an efficient manner.

FIG. 7 is a flowchart showing an illustrative method for object visualization. According to certain illustrative examples, the method includes providing (block 602) an operator with an object filter tool through a graphical user interface, the tool comprising a rail having a number of shapes placed at distances from each other along the rail, the shapes representing divisions within a list of objects, distances between the shapes correlating to a number of objects between the divisions. The method further includes receiving (block 604) from the operator, an interaction with the tool indicating a selection of objects within the list and presenting (block 606) to the operator, a list of objects filtered based on the interaction with the filter tool.

In conclusion, through use of methods and systems embodying principles described herein, an administrator can be provided with an efficient mechanism for viewing, filtering, and managing objects. In cases where there are several objects spread horizontally within a particular hierarchal level, the administrator can easily and intuitively navigate through such objects. The administrator may then perform the various administrative functions on those objects.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for object visualization performed by a physical computing system, the method comprising:
   providing an operator with an object filter tool through a graphical user interface, wherein the object filter tool includes a first circular line corresponding to a first filter and a second circular line corresponding to a second filter, wherein the second circular line is generated without receiving a first interaction with the first circular line from the operator, wherein the first circular line includes a first number of shapes placed at distances from each other along the first circular line, wherein the first number of shapes are connected by continuous line segments of the first circular line, wherein each shape of the first number of shapes has a distinct label including a division value associated with the shape, wherein each shape of the first number of shapes represents a division within a first list of objects according to the division value associated with the shape, wherein lengths of the continuous line segments between the first number of shapes indicate a total count of objects between the divisions, and wherein the division values associated with the first number of shapes are alphabetical division values or numerical division values;

receiving from the operator, a second interaction with the object filter tool indicating a selection of objects within the first list of objects; and presenting to the operator, a second list of objects filtered based on the second interaction with the object filter tool.

2. The method of claim 1 wherein the second circular line includes a second number of shapes placed along the second circular line, the second circular line being used to filter the first list of objects of a different dimension than the first circular line.

3. The method of claim 1, wherein each of the first number of shapes is a circle centered on and overlapping the first circular line, whereby the first circular line is not visible at each location of the first number of shapes.

4. The method of claim 1, further comprising receiving an interaction with a center of the first circular line from the operator, wherein the interaction selects all objects within a dimension represented by the first circular line.

5. The method of claim 1, further comprising receiving an interaction with a continuous line segment of the first circular line between the shapes from operator, wherein the interaction filters out all objects of the first list of objects not within a division associated with the continuous line segment.

6. The method of claim 1, wherein the first circular line filters objects in a particular dimension, the particular dimension includes resources, hosts, usernames of a computer network system, or a combination thereof.

7. The method of claim 1, further comprising, providing to the operator, a tool for changing a dimension for which the first circular line filters objects.

8. The method of claim 1, wherein each of the divisions represented by the first number of shapes are numerical divisions, and wherein each of the division values associated with the first number of shapes are numerical division values.

9. The method of claim 8, wherein the numerical divisions represent divisions between a plurality of virtual machines, wherein each virtual machine of the plurality of virtual machines is represented by a unique number.

10. The method of claim 1, wherein each shape of the first number of shapes is a circle centered on and overlapping the first circular line, whereby the first circular line is not visible at each location of the first number of shapes.

11. A computing system comprising:
at least one processor;
a memory communicatively coupled to the at least one processor, the memory comprising computer executable code that, when executed by the at least one processor, causes the at least one processor to:
provide an operator with an object filter tool through a graphical user interface, wherein the object filter tool includes a first circular line corresponding to a first filter and a second circular line corresponding to a second filter, wherein the second circular line is generated without receiving a first interaction with the first circular line from the operator, wherein the first circular line includes a first number of shapes placed at distances from each other along the first circular line, wherein the first number of shapes are connected by continuous line segments of the first circular line, wherein each shape of the first number of shapes has a distinct label including a division value associated with the shape, wherein each shape of the first number of shapes represents a division within a first list of objects according to the division value associated with the shape, wherein lengths of the continuous line segments between the first number of shapes indicate a total count of objects between the divisions, and wherein the division values associated with the first number of shapes are alphabetical division values or numerical division values;

receive from the operator, a second interaction with the object filter tool indicating a selection of objects within the first list of objects; and present to the operator, a second list of objects filtered based on the second interaction with the object filter tool.

12. The system of claim 11, wherein the second circular line includes a second number of shapes placed along the second circular line, the second circular line being used to filter the first list of objects of a different dimension than the first circular line.

13. The system of claim 11, wherein each of the first number of shapes is a circle centered on and overlapping the first circular line, whereby the first circular line is not visible at each location of the first number of shapes.

14. The system of claim 11, wherein the computer executable code, when executed by the at least one processor, further causes the at least one processor to select all objects within a dimension represented by the first circular line in response to receiving an interaction with a center of the first circular line from the operator.

15. The system of claim 11, wherein the computer executable code, when executed by the at least one processor, further causes the at least one processor to filter out all objects of the first list of objects not within a division associated with a continuous line segment of the first circular line in response to receiving an interaction with the continuous line segment of the first circular line between the shapes.

16. The system of claim 11, wherein the first circular line filters objects in a particular dimension, the particular dimension includes resources, hosts, usernames of a computer network system, or a combination thereof.

17. The system of claim 11, wherein each of the divisions represented by the first number of shapes are numerical divisions, wherein each of the division values associated with the first number of shapes are numerical division values, wherein the numerical divisions represent divisions between a plurality of virtual machines, wherein each virtual machine of the plurality of virtual machines is represented by a unique number.

18. A non-transitory computer-readable storage medium comprising instructions that when executed cause a processor of a computing device to:
provide an operator with an object filter tool through a graphical user interface, wherein the object filter tool includes a first circular line corresponding to a first filter and a second circular line corresponding to a second filter, wherein the second circular line is generated without receiving a first interaction with the first circular line from the operator, wherein the first circular line includes a first number of shapes placed at distances from each other along the first circular line, wherein the first number of shapes are connected by continuous line segments of the first circular line, wherein each shape of the first number of shapes has a distinct label including a division value associated with the shape, wherein each shape of the number of shapes represents a division within a first list of objects according to the division value associated with the shape, wherein lengths of the continuous line segments between the first number of shapes indicate a total count of objects between the divisions, and wherein the division values associated with the first number of shapes are alphabetical division values or numerical division values;

receive from the operator, a second interaction with the object filter tool indicating a selection of objects within the first list of objects; and present to the operator, a second list of objects filtered based on the second interaction with the object filter tool.

19. The non-transitory computer-readable storage medium of claim 18, wherein each of the divisions represented by the first number of shapes are alphabetical divisions, and wherein each of the division values associated with the first number of shapes are single alphabetical letters.

20. The non-transitory computer-readable storage medium of claim 18, wherein each of the divisions represented by the first number of shapes are numerical divisions, wherein each of the division values associated with the first number of shapes are numerical division values, wherein the numerical divisions represent divisions between a plurality of virtual machines, wherein each virtual machine of the plurality of virtual machines is represented by a unique number.

\* \* \* \* \*